United States Patent [19]
Gegner

[11] Patent Number: 5,404,092
[45] Date of Patent: Apr. 4, 1995

[54] HIGH POWER FACTOR AC-DC CONVERTER WITH REACTIVE SHUNT REGULATION

[75] Inventor: Joel P. Gegner, Oak Park, Ill.

[73] Assignee: Motorola, Inc., Schaumburg, Ill.

[21] Appl. No.: 116,433

[22] Filed: Sep. 3, 1993

[51] Int. Cl.6 .............................................. G05F 1/30
[52] U.S. Cl. ..................................... 323/207; 363/65
[58] Field of Search ................. 323/205, 207; 363/15, 363/16, 65, 71, 84, 89, 125

[56] References Cited

U.S. PATENT DOCUMENTS

| | | | |
|---|---|---|---|
| 3,829,759 | 8/1974 | Thorborg | 323/207 |
| 3,900,792 | 8/1975 | Moltgen | 323/207 |
| 4,663,702 | 5/1987 | Tanaka | 363/65 |
| 4,752,726 | 6/1988 | Aoyama | 323/207 |
| 4,999,760 | 3/1991 | Tietema | 363/65 |
| 5,047,909 | 9/1991 | Hosoda | 323/207 |
| 5,291,119 | 3/1994 | Cowett | 323/207 |

Primary Examiner—Steven L. Stephan
Assistant Examiner—Matthew Nguyen
Attorney, Agent, or Firm—John M. England, Jr.

[57] ABSTRACT

A high power factor AC to DC converter with shunt regulation include first and second power converters for converting AC power to DC power; the first power converter receives and regulates input power from a power source and delivers a component of an output power to a load. The second power converter delivers another component of the output power to the load. The first power converter includes a unidirectional power output connected to the load. The second power converter includes a bi-directional power input shunted across the load with a bi-directional power output connected to an energy storage apparatus for storing a difference between the input power and the output power components 8 Claims, 6 Drawing Sheets

HIGH POWER FACTOR AC-DC CONVERTER WITH REACTIVE SHUNT REGULATION

FIELD OF THE INVENTION

This invention relates generally to switching power converters and more particularly to providing a reactive shunt regulation circuit for use therewith.

BACKGROUND OF THE INVENTION

High frequency switching off-line AC-to-DC converters are known to possess a relatively poor input power factor and display significant input current harmonic distortion. Large input current surges result from the switching action of the AC rectifying bridge along with the low impedance of the input filter capacitor. Typical power factor for off-line AC-to-DC converters is 0.65. To improve power factor and reduce the input current harmonic distortion, active power factor correction (APFC referred to simply as PFC) techniques have been developed. The PFC technique may be implemented by use of an AC-to-DC converter whose switches are controlled such that the input current follows the same sinusoidal shape as the input voltage. By controlling the input current, the input power can be controlled.

Figure 1:
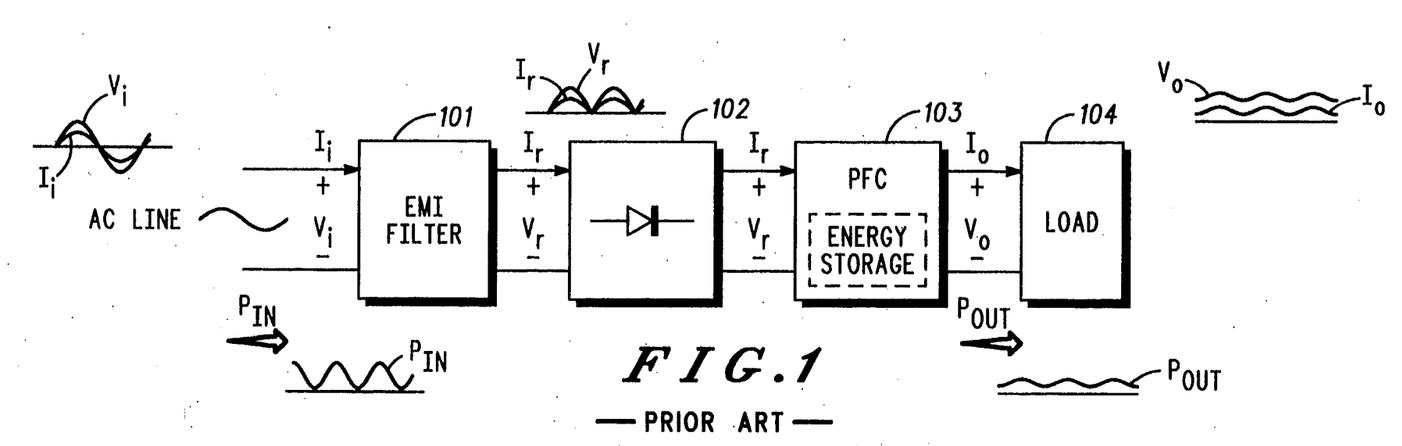
FIG. 1–4 illustrates prior art Power Factor Corrections (PFC) AC-to-DC converters.

Assuming that the input voltage is sinusoidal with frequency $f_l$, the input power $P_{in}$ will be proportional to a $\sin^2(2 f_l t)$ function. As a result, to provide power to a load during the low portion of the input voltage, energy must be stored within the PFC converter. FIG. 1 shows this configuration. Typically, energy is stored in a large capacitor (105) at the output of the PFC converter. When the input line voltage is low, the load (104) draws its power from this energy storage capacitor (105), causing its voltage to droop. When the input line voltage is at a peak, excess current flows through the PFC converter (103) and into the energy storage capacitor (105) causing its voltage to rise. The frequency of the voltage ripple present across the energy storage capacitor (105) (as well as the load (104)) is twice input voltage frequency. This voltage ripple may be decreased by increasing the size of the capacitor, but this will degrade the dynamic response of the converter as well as increase cost and size.

In some applications, low frequency voltage ripple and slow dynamic response is tolerable, in which case the configuration in FIG. 1 is acceptable. However, in many situations, a tightly regulated output voltage is required. Therefor, fast dynamic response is required for responding to line voltage changes and/or load changes. With only a PFC converter, the input power is controlled, however the output power is unregulated. Naturally, by power conservation, the average input power must equal the average output power, however the instantaneous power flowing to the load is determined only by the instantaneous voltage across the energy storage capacitor. If the load is resistive with resistance $R_o$, then the instantaneous output power will simply equal $V_o^2/R_o$. To tightly regulate the output voltage, the instantaneous output power must be controlled.

Figure 2:
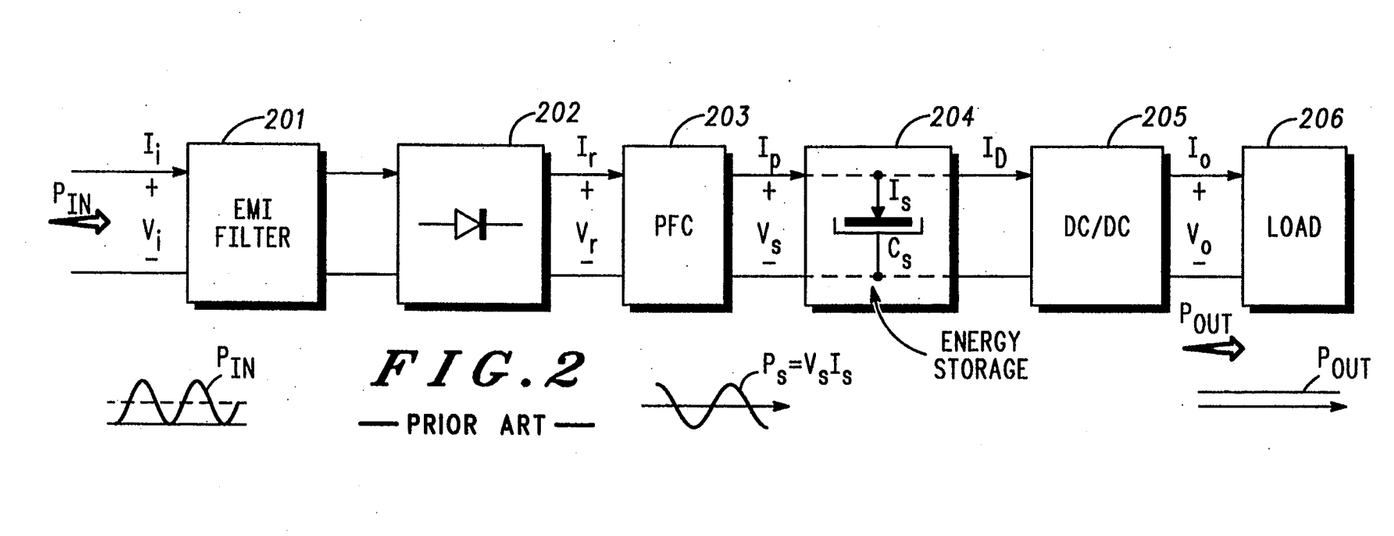

This may be accomplished by the addition of a DC-to-DC converter following the energy storage capacitor. This configuration is shown in FIG. 2. In this configuration, the PFC converter (203) is again controlled so that the input current follows the shape of the input line voltage, and the added DC-to-DC converter (205) is controlled in such a way that the output voltage is tightly regulated. If the load suddenly demands more power, the DC-to-DC converter (205) responds quickly, drawing more energy from the energy storage capacitor (204). If more energy is drawn from the capacitor (204) than is supplied by the PFC converter (203), its voltage will begin to droop. This decrease in voltage is sensed by the PFC converter (203) which in turn causes the input current to increase in magnitude all the while following the shape of the sinusoidal input voltage.

A favorable aspect of this configuration is that the two control loops for regulating the input current and regulating the output voltage are independent. When the instantaneous input power is greater than the instantaneous output power, energy will flow into the energy storage capacitor (204). If the converse is true, then energy will flow from the energy storage capacitor (204) supplying sufficient power for the second DC-to-DC converter (205). Although very widely used, this configuration has a drawback: The average power flowing to the output must be processed by two converter stages—the PFC converter (203), and the DC-to-DC converter (205). This leads to lower efficiencies as well as a larger power supply.

Figure 3:
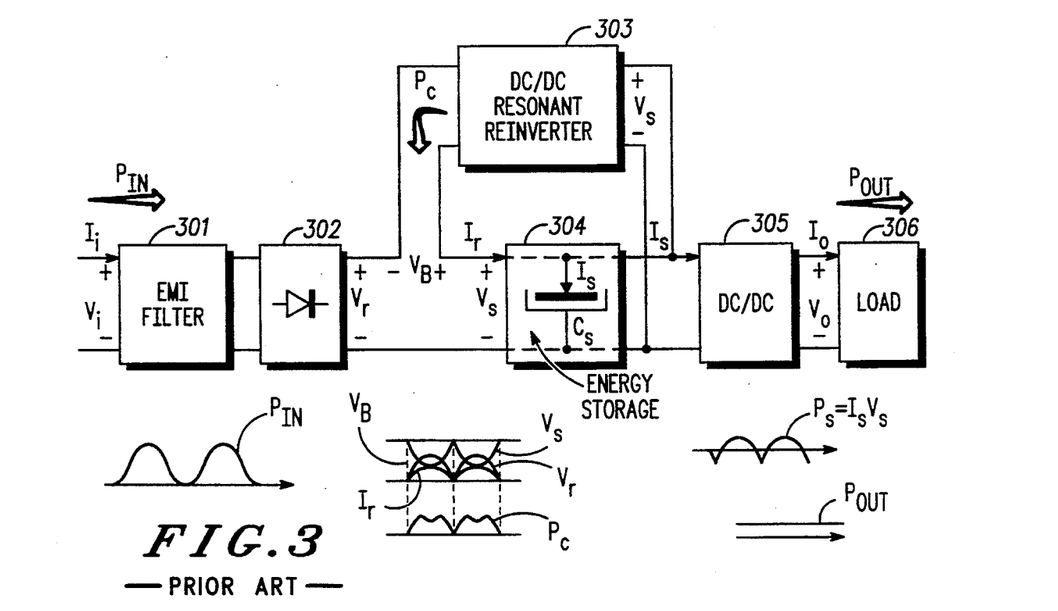

Recently, efforts have been made to integrate these two power stages into a single converter. Some methods attempt to use the same set of power switches for controlling the input as well as the output power, thereby meeting both objectives. One such method is shown in FIG. 3 in which two DC-to-DC converters appear. When implemented, these two converters (303, 305) may be constructed to share their power switches thereby reducing the number of components.

For purpose of explanation, these two converters have been distinguished one from the other in FIG. 3. The first DC-to-DC converter (303) is placed in series with the input rectifier bridge (302) so that its output current corresponds to the input current of the power supply. By controlling the output current of this converter (303), the input rectified AC current may be controlled thereby achieving power factor correction. This input current flows into the energy storage capacitor (304) which supplies both DC-to-DC converters (303, 305). The second DC-to-DC converter (305) is controlled to supply a constant voltage to the load (306). The advantage of this technique is that the first DC-to-DC converter (303) may be rated for a power rating as small as 13.7% of the output power. This occurs if the voltage across the energy storage capacitor (304) is equal to the peak of the input AC line voltage.

Typically however, the line voltage will tend to vary significantly leading to one of two things: Either the voltage across the energy storage capacitor (304) will vary with the peak of the AC line voltage forcing the second DC-to-DC converter (305) to be designed for wide input voltage range, or the voltage across the energy storage capacitor (304) can be fixed at the peak of the highest input AC line voltage causing excessive power (more than twice the average output power) to circulate through the first DC-to-DC converter (303) when the input is at low line.

Some converters possess an input impedance which closely resembles that of a resistor. In these converters, the peak input current inherently tends to be proportional to the input line voltage. When designed properly, the average input current will also closely follow the shape of the input voltage. As a result, no special control of the power switch(es) is needed to achieve a high power factor. If energy may be somehow stored in the converter, then a tightly regulated output voltage may be achieved by any conventional technique such as voltage mode, current mode, or charge mode control. This configuration appears identical to that of FIG. 1. The difference is the actual PFC converter (103) topology used.

Typically, the converters which manifest a relatively voltage independent input impedance are either resonant converters, or converters operated in discontinuous conduction mode. That is to say that the input current flowing through an input inductor falls to zero by the end of each switching cycle. Unfortunately, in resonant converters, the power factor is limited due to the sensitivity of the input impedance to input voltage variations. One the other hand, converters operated in discontinuous conduction mode exhibit higher power factor, but they are limited in power level due to high rms currents.

Figure 4:
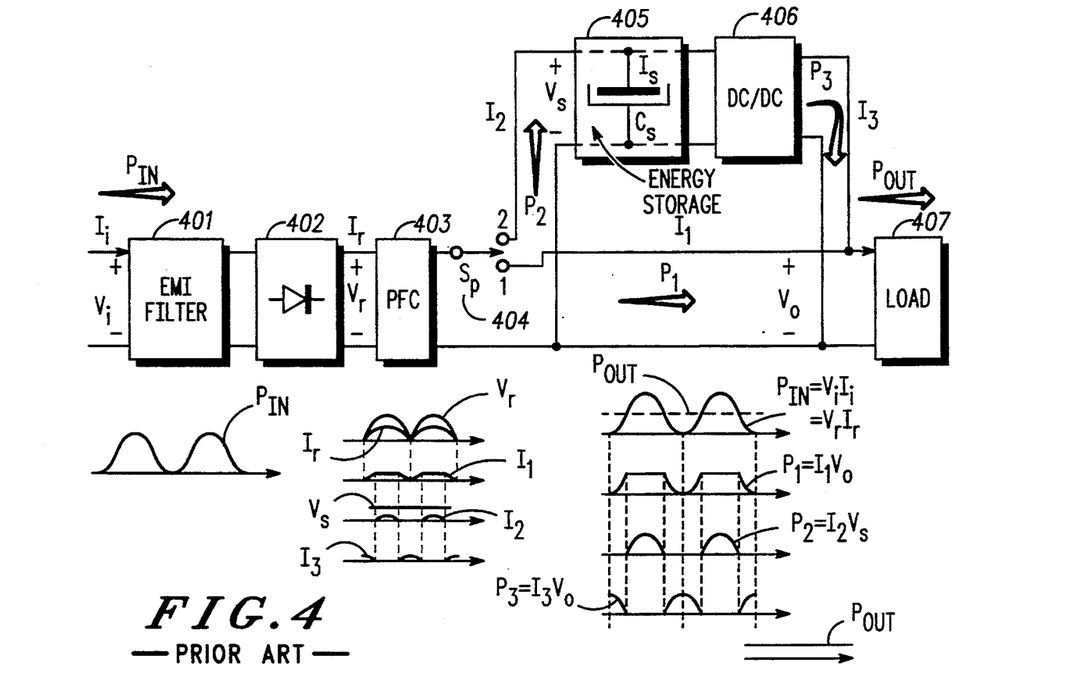

Another AC-to-DC technique has recently been proposed and is shown in FIG. 4. This technique minimizes the amount of power processed by each converter stage. Two power converters exist: a first DC-to-DC converter (403) is controlled primarily as a PFC preregulator, and a second converter (406) is controlled to regulate the output voltage. The PFC converter (403) is operated so that the input current follows the shape of the input voltage, however in addition, the switches of the PFC may control which of two paths the input power may take. Either, the input power may flow directly to the output load (407), or it may flow to an energy storage capacitor (405) present at the input of the second DC-to-DC converter (406). When the input power is greater than the desired output power, the input power is split into two paths during each switching cycle. If switch $S_p$ (404) is in position 1, then the input power flows directly to the output load (407). If however, switch $S_p$ (404) is in position 2, the input power flows to the energy storage capacitor $C_s$ (405).

Assuming that a Boost type topology is used for the PFC converter (403), we may conclude that power flows from the PFC (403) for a period of $D'T_s$ each switching cycle, where $D'$ is the off-time of the Boost switch(es) divided by the switching period $T_s$. If for example, the average input power over a switching period $T_s$ is 150% greater than the output power over that same period, then switch $S_p$ would direct power to the load for 66.7% of the period $D'T_s$, and for the remaining 33.3% of the period $D'T_s$, power would be directed to the energy storage capacitor (405). In this way the average output power over each switching period $T_s$ may be constant. During this time the second DC-to-DC converter (406) would be inactive since sufficient power for the load (407) could be provided by the AC input.

If however, the average input power over a switching period $T_s$ is less than the average output power over the same period, then switch $S_p$ (404) remains in position 1 so that all of the input power is directed to the output. In addition, during this period the second DC-to-DC converter (406) is operated such that it supplies additional power to the output load (407) for maintaining the average output power constant over each switching cycle. Naturally, the energy stored in the energy storage capacitor (405) during the peak portion of the input power supplies the second DC-to-DC converter (406) with energy when the input power is less than the output power.

The advantage of this technique is that part of the first DC-to-DC converter (403) handles only 68% of the average input power, while the second DC-to-DC converter (406) handles only 32% of the average input power. As a result, overall power conversion efficiency as well as power density may be increased. The drawbacks to this technique concern the complexity of control involved in achieving high input power factor as well as a tightly regulated output. In addition, two safety-approved isolation transformers are required, one for each converter (403, 406).

SUMMARY OF THE INVENTION

The high power factor AC-to-DC converter which is the subject of this invention exhibits similar advantages as the previously described technique but without the added control complexity or the two required safety approved isolation transformers.

Detailed Description of the Preferred Embodiment

Figure 5:
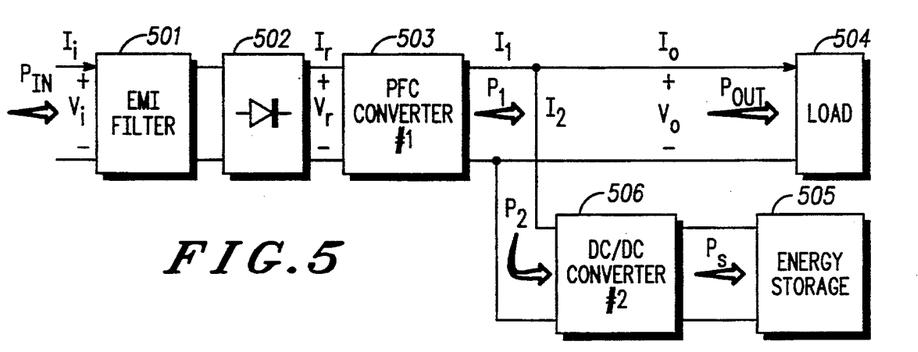
FIG. 5 Shows the novel Power Factor Correction AC-to-DC converter with shunt regulation.
Figure 6:
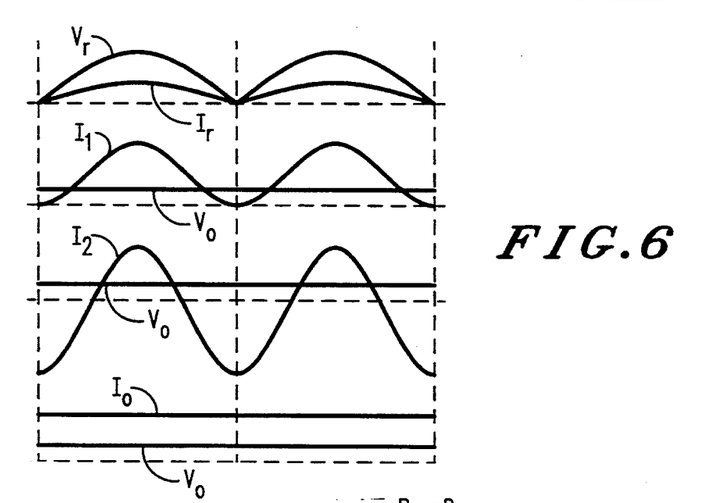
FIG. 6–7 Depicts the key waveforms of the AC-to-DC converter of FIG. 5.
Figure 7:
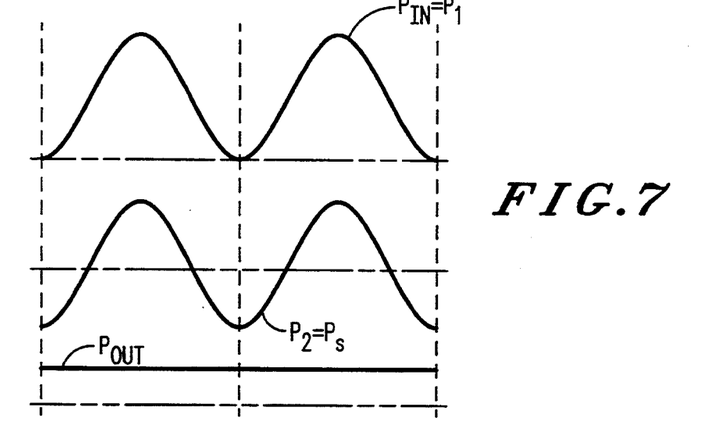

A novel converter is shown in FIG. 5, its associated waveforms are shown in FIGS. 6 and 7. These waveforms include voltages, currents, and powers which have all been averaged over a switching period $T_s$. The principle of operation of the present invention may be described as follows: The novel AC-to-DC converter of FIG. 5 includes two DC-to-DC converters (503, 506) which together accomplish the following tasks: control the average input current $I_i$ over a converter switching period $T_s$ to follow the shape (typically sinusoidal) of the input voltage $V_i$, and regulate the average output power over each converter switching period $T_s$ to a desired value such that constant output voltage, current, or power may be maintained independent of output load (504) variations. This is accomplished by appropriately controlling the input current using converter 1 (503), and by controlling the output current by appropriately controlling converter 2 (506).

For the sake of explanation, let us assume that the input voltage is a pure sinusoid, and that a constant DC output voltage is desired:

$$V_i = V_{im} \sin(2\pi f_l t)$$

where $f_l$ is the frequency of the sinusoidal input voltage. Then, with converter 1 (503) controlling the average input current $l_i$ to follow the shape of the input voltage $V_i$, the input power $P_{in}$ will take on the form of a sinusoid squared:

$$P_{in} = I_{in} V_{in} = V_{im} \sin^2(2\pi f_l t)$$

where $$I_i = I_{im} \sin(2\pi f_l t)$$

The rectified input voltage $V_r$ and rectified input current $l_r$ are shown in FIG. 6, while the input power $P_{in}$ is shown in FIG. 7. Assuming power conservation, the average power over a switching period $T_s$ flowing into converter 1 (503) must equal the average power flowing out of converter 1 (503). Therefor we have the relationship:

$$P_{in} = I_i V_i = I_r V_r = I_1 V_o$$

where the currents and voltages are denoted in FIG. 5. With the output voltage $V_o$ constant, we therefor may calculate $l_1$ as $$I_1 = \frac{V_i I_i}{V_o} = \frac{V_{im} I_{im}}{V_o} \sin^2(2\pi f_l t) = \frac{V_{im} I_{im}}{2 V_o} [1 - \cos(2\pi 2 f_l t)]$$

We note that this current contains a DC component as well as an AC component at twice the input voltage frequency $f_l$. By controlling the second DC-to-DC converter (506) so that its input current $l_2$ takes on the form of the AC current component of current $l_1$, the output current $l_o$ will be constant:

$$I_2 = -\frac{V_{im} I_{im}}{2 V_o} \cos(2\pi 2 f_l t)$$

$$I_o = \frac{V_{im} I_{im}}{2 V_o}$$

Note that power conservation over the input voltage period $T_l = 1/f_l$ has been satisfied:

$$<P_{in}>_{Tl} = \frac{1}{T_l} \int_0^{T_l} P_{in}(t) dt = \frac{I_{im} V_{im}}{2} = I_o V_o = P_{out}$$

The second DC-to-DC converter (506) is in effect acting as a reactive current shunt absorbing a current $l_2$, and a power flow $P_2$:

$$P_2 = V_o I_2 = -\frac{V_{im} I_{im}}{2} \cos(2\pi 2 f_l t) = -P_{out} \cos(2\pi 2 f_l t)$$

The average power flowing into this second DC-to-DC converter (506) may be calculated to be $P_{out}/\pi \cong 0.32 P_{out}$. Therefor the average power flowing out of the converter is also $0.32 P_{out}$. As a result, this second converter (506) need only be designed to handle 64% of the average output power. The distinctive feature of this converter (506) is that it must be capable of bi-directional current flow and bi-directional power flow.

Again, energy storage (505) must exist for holding up the output when the input voltage is in a low portion of the line cycle. This energy storage (505) is provided at the output of the second DC-to-DC converter (506). The energy storage (505) may be of any form, however for explanation purposes we will assume it is a large capacitor. During normal operation, the average power $P_s$ over a switching period $T_s$ flowing into the capacitor (505) will be sinusoidal, and is shown in FIG. 7. If however, the output load (504) suddenly demands more power, then the second converter (506) will quickly respond ensuring that the output voltage remains regulated.

Initially, this additional required power will flow from the energy storage capacitor (505). However, as this occurs, the voltage on the capacitor (505) will begin to droop. The PFC converter (503) will sense this decrease in voltage and will initiate an increase in the input current magnitude all-the-while controlling the input current to still follow the input voltage shape. If for example, the energy storage element (505) was an inductor rather than a capacitor, the PFC converter (503) would then sense a decrease in current flowing through the energy storage inductor (505), and would again cause the input current magnitude to increase.

The first converter (503) is therefore responsible for controlling the input current, following the shape of the input voltage while continuously adjusting the input current magnitude so as to maintain a constant energy storage level in the energy storage element (505).

The second converter (506) is responsible for regulating the output. Recall that in general this regulation may consist of a regulated output power, regulated output voltage, or regulated output current to the load (504). In the example of a regulated output voltage, conventional techniques such as voltage mode, current mode, or charge control may be used to control the switches of the second converter (506). The output voltage $V_o$ as well as the output current $l_o$ may be used to regulate the output.

Figure 8:
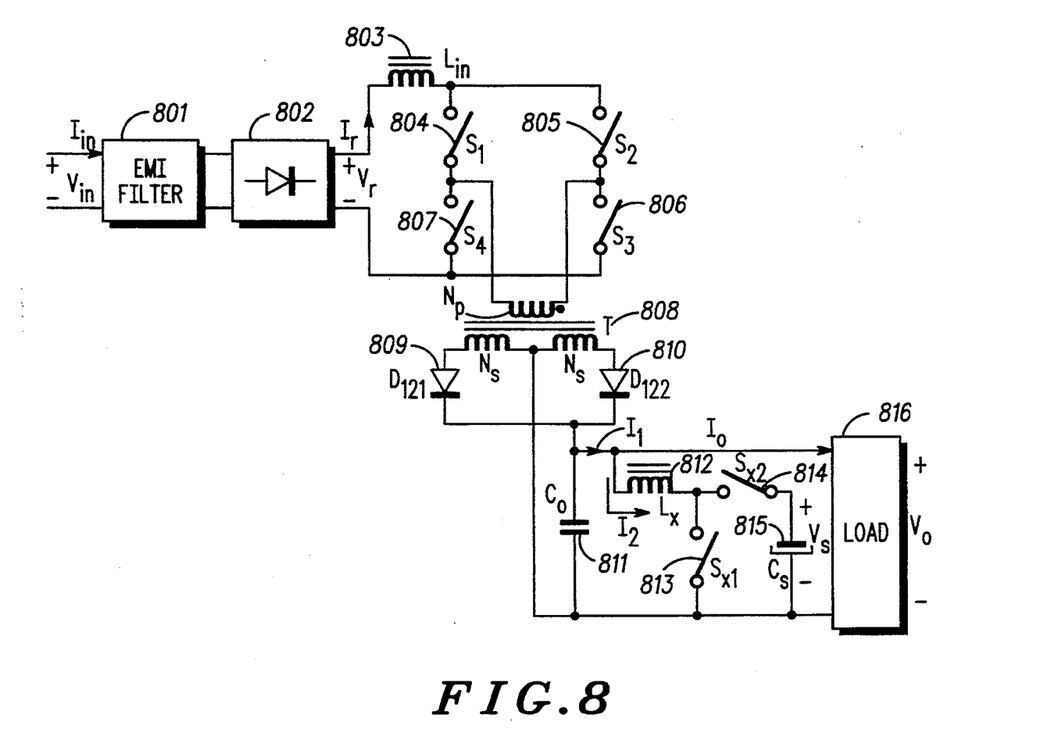
FIG. 8 Illustrates an exemplary embodiment of the AC-to-DC converter of FIG. 5.
Figure 9:
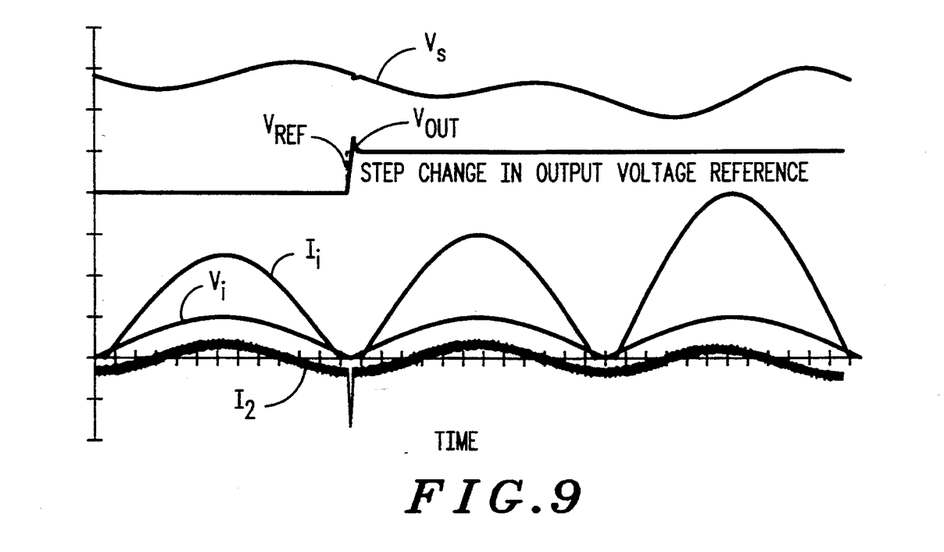
FIG. 9 shows simulated waveforms of the converter of FIG. 8 where the output voltage follows a step increase in the output reference voltage while still achieving input power factor correction.
Figure 10:
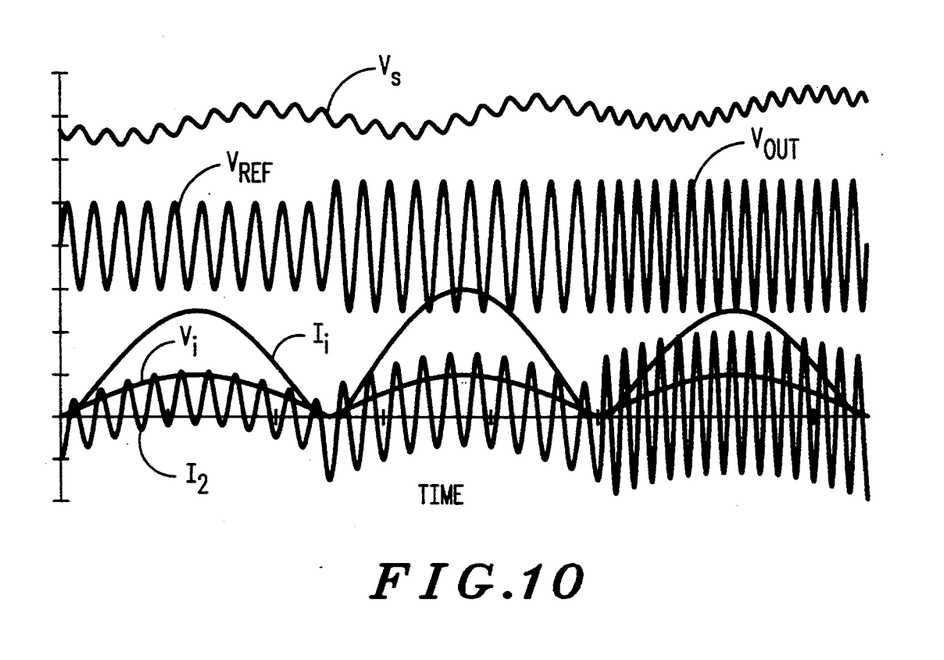
FIG. 10 shows simulated waveforms of the converter of FIG. 8 where the output voltage follows a varying sinusoidal output reference voltage while still achieving input power factor correction.

An exemplary circuit configuration is shown in FIG. 8 where a full-bridge isolated Boost converter is used as the PFC converter, and a bi-directional power flow Boost converter is used as the second converter. Switches $S_{x1}$(813) and $S_{x2}$(814) are operated in a complementary fashion so that the current flowing in the Boost inductor $L_x$(812) may be of either polarity depending on the volts-seconds established by the duty cycle of the switches (813, 814). Simulation waveforms of such a converter are shown in FIGS. 9 and 10. The first simulation shows the ability of achieving input power factor correction while also tightly regulating the output voltage to follow a constant reference. A 25% increase in the output reference voltage is quickly tracked by the second DC-to-DC converter augmenting the required output power to cause the output voltage to follow the reference voltage step increase. The second simulation shows the ability of achieving input power factor correction while also tightly regulating the output voltage to follow a sinusoidal voltage reference. Again, the second DC-to-DC converter is able to cause the output voltage to track the reference voltage variations.

Figure 11:
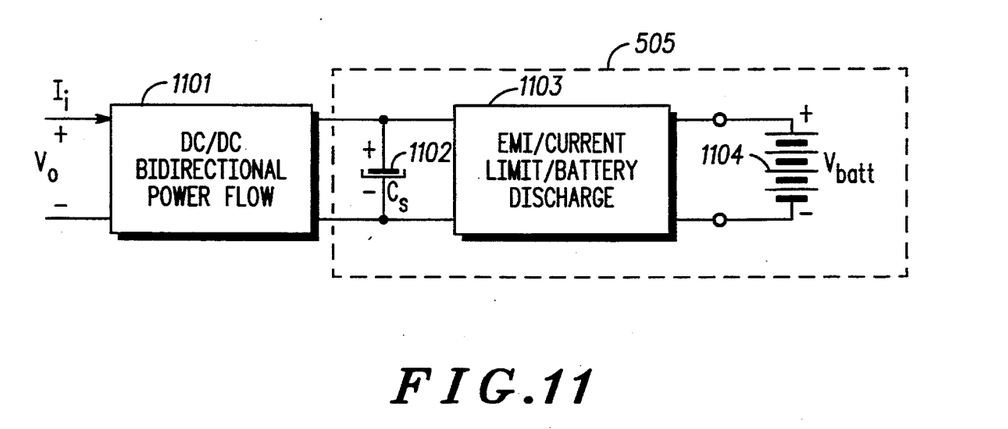
FIG. 11 shows the implementation of a battery as the energy storage means for the converter of FIG. 5.

As mentioned previously, energy storage may be accomplished in a number of different ways. For purposes of illustration, a capacitor was previously used as the energy storage element. If a battery back-up system is to be incorporated in the power system, then it may be accomplished as shown in FIG. 11. In this figure a battery (1104) has been connected to the energy storage capacitor (1102) via current limiting, EMI filter, and disconnect type circuitry (1103).

With this implementation, the battery (1104) may be the primary energy storage element, and the capacitor (1102) may be designed much smaller, serving primarily as a filter capacitor. In addition, since the second DC-to-DC converter (1101,506)) is in effect always controlling the power flowing in and out of the energy storage element (505) such that the output is regulated, we therefor have an inherent battery revert mechanism. During an AC line brown-out or failure, the current flowing from the first DC-to-DC converter (503) will quickly decrease to zero.

Consequently, the output current will decrease causing the output voltage to begin to droop. The second DC-to-DC converter (506, 1101) will sense this failure and will increase the power flow from the energy storage element (505) such that it provides all the necessary power to maintain the output voltage regulated. Naturally over time, energy will be depleted from the battery (1104). At a specified depletion level, the battery (1104) may be disconnected to prevent its full discharge. When the AC power returns, the battery (1104) may be recharged. This may be accomplished by programming the average rectified AC current to be greater than the average output current. Since the second DC-to-DC converter (1101,506) controls the power to and from the energy storage element (505) such that the output is regulated, a net current will consequently flow to the battery (1104), corresponding to an amount of power equal to the difference between the average input power and average output power. Charge rate, fold back, etc. may all be built in. It is noted that the control of this type of configuration may be accomplished in many ways, and the basic concept is simply being presented.

Figure 12:
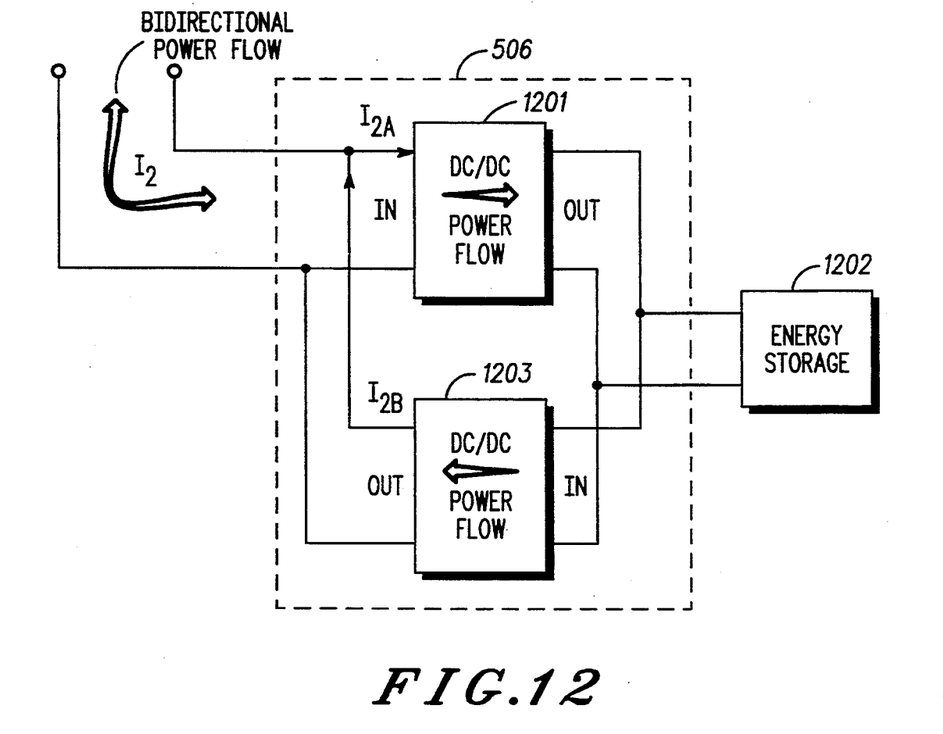
FIG. 12 shows a bi-directional power converter of the invention including two uni-directional power flow converters connected in an anti-parallel fashion.
Figure 13:
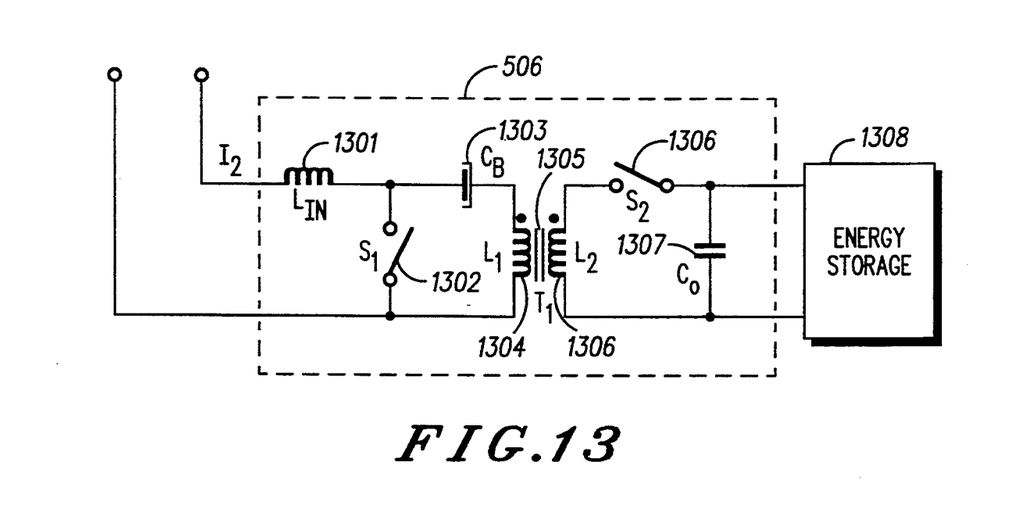
FIG. 13 Shows an implementation of a bi-directional power converter using the SEPIC converter with two active power switches.

It is to be noted that the two DC-to-DC converters (503, 506) used in this technique may be of any type. To demonstrate this, two implementations of the second DC-to-DC converter (506) of FIG. 5 are shown in FIGS. 12 and 13. FIG. 12 shows that the power converter (506) may be implemented using two unidirectional power converters (1201 and 1203) connected in parallel such that the input of the first converter (1201) is connected to the output of the second converter (1203), and the output of the first converter (1201) is connected to the input of the second converter (1203). As seen in FIG. 12, when power flows to the energy storage element (1202), the first converter (1201) controls that power flow, and the second converter (1203) is inactive. However, if power flows from the energy storage element (1202), the first converter (1201) is inactive and the second converter (1203) controls that power flow. In this instance, each converter (1201 and 1203) would handle an average of ~32% of the total output power flowing to the load.

FIG. 13 shows another implementation of the bi-directional power converter (506). In this instance, a SEPIC converter has been used where the rectifying diode has been replaced by active power switch $S_2$ (1306). Active switches $S_1$ (1302) and $S_2$ (1306) are operated in a complementary fashion such that current in the inductor $L_{in}$ (1301) may flow in a positive or negative direction depending on the volts-seconds across it (determined by the duty cycle of the two switches). As shown by this implementation, even isolated type topologies may be used for achieving the bi-directional power converter (506).

Finally, it is noted that although the Power Factor Correction technique presented refers to FIG. 5 as an AC-to-DC converter, this is only one possible implementation where an AC input has been filtered by an EMI filter (501) and rectified by a rectifier bridge (502). The principle of operation described is invariance should the input consist of an AC or DC input voltage. Clearly, in the event that the input were a DC or DC plus AC voltage such that its polarity never changes, then the rectifier bridge (502) would not be required.

In point of fact, even with an AC input voltage, the distinction between the rectifier bridge (502) and the power factor correction DC-to-DC converter (503) is not required. Indeed, some switching power converters incorporate rectification with the switching converter thereby replacing the rectifier bridge (502) and DC-to-DC converter with a single AC-to-DC converter. With this type of implementation, the operation principles of the novel power factor correction technique presented herein still apply, as one of ordinary skill may conclude.

It is purposefully contemplated that the teachings of the present invention as hereinabove described not be limited to the described embodiments, as one of ordinary skill in the art will appreciate and can readily ascertain from the above disclosure taken in combination with the following claims.

I claim:

1. A high power factor AC to DC converter with shunt regulation comprising first and second power converter means for converting AC power to DC power, said first power converter means for receiving and regulating an input power from a power source and delivering at least a component of an output power of said AC to DC converter means to a load, said second power converter means delivering another component of said output power to said load, wherein said first power converter means comprises a unidirectional power output operatively connected to said load and said second power converter means comprises a bi-directional power input operatively shunted across said load and further comprises a bi-directional power output operatively connected to an energy storage means for storing a difference between said input power and said output power components whereby said second power converter means regulates the sum of output power to said load.

2. The high power factor AC to DC converter of claim 1 wherein said first power converter means regulates said input power such that a high input power factor is achieved.

3. The high power factor AC to DC converter of claim 2 wherein said input power source comprises an AC mains.

4. The high power factor AC to DC converter of claim 1 wherein said energy storage means comprises at least one capacitor.

5. The high power factor AC to DC converter of claim 1 wherein said energy storage means comprises at least one inductor.

6. The high power factor AC to DC converter of claim 1 wherein said energy storage means comprises electrochemical means for storing and releasing energy.

7. The high power factor AC to DC converter of claim 1 wherein said energy storage means comprises electromechanical means for storing and releasing energy.

8. The high power factor AC to DC converter of claim 1 further comprising energy delivery means for said second power converter to deliver all output power from said energy storage means to said load.

* * * * *